(12) United States Patent  (10) Patent No.: US 8,589,487 B1
Reeves et al.  (45) Date of Patent: Nov. 19, 2013

(54) PARALLEL MULTIMEDIA CONFERENCING

(75) Inventors: Raymond Emilio Reeves, Olathe, KS (US); Simon Youngs, Overland Park, KS (US); Gary Duane Koller, Overland Park, KS (US); Mark Douglas Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 283 days.

(21) Appl. No.: 13/190,204

(22) Filed: Jul. 25, 2011

(51) Int. Cl.
G06F 15/16 (2006.01)

(52) U.S. Cl.
USPC .......... 709/204; 709/203; 709/207; 709/223; 709/231

(58) Field of Classification Search
USPC .................... 709/203, 204, 207, 223, 231
See application file for complete search history.

(56) References Cited

U.S. PATENT DOCUMENTS

| | | | |
|---|---|---|---|
| 5,896,565 A | 4/1999 | Miller | |
| 6,801,612 B2 | 10/2004 | Malcolm | |
| 2004/0236856 A1* | 11/2004 | Keohane et al. | 709/229 |
| 2007/0050509 A1* | 3/2007 | Litteaut et al. | 709/227 |
| 2007/0279484 A1* | 12/2007 | Derocher et al. | 348/14.09 |
| 2008/0098067 A1* | 4/2008 | O'Sullivan et al. | 709/204 |
| 2008/0316297 A1* | 12/2008 | King et al. | 348/14.09 |
| 2010/0250679 A1* | 9/2010 | Wang | 709/204 |
| 2011/0043602 A1* | 2/2011 | Lee | 348/14.09 |
| 2012/0236716 A1* | 9/2012 | Anbazhagan et al. | 370/235 |
| 2013/0117059 A1* | 5/2013 | Norton et al. | 705/7.18 |

OTHER PUBLICATIONS

"X-Lite 3.0 User Guide" Copyright 2006 CounterPath Solutions, Inc.
"IBM AbilityLab Sametime Conference Transcriber" Copyright IBM Corporation Apr. 2011.

* cited by examiner

Primary Examiner — Liangche A Wang

(57) ABSTRACT

A method, server, and media are provided for providing parallel multimedia conferences. A multimedia conference server enables a user to participate in several multimedia conferences simultaneously. The server receives a request to establish parallel multimedia conferences from a user. In turn, the server generates a data stream for the content of the each of the multimedia conferences associated with the user. The data stream may include transcriptions and notifications for the user. The multimedia conference server transmits the data stream and notifications to the user.

19 Claims, 4 Drawing Sheets

PARALLEL MULTIMEDIA CONFERENCING

SUMMARY

Embodiments of the invention are defined by the claims below, not this summary. A high-level overview of embodiments of the invention is provided here for that reason, to provide an overview of the disclosure. Embodiments of the invention are defined by the claims below. Embodiments of the invention provide wireless devices, servers, methods, and computer-readable media for, among other things, delivering parallel multimedia conferences to a participant. The embodiments of the invention have several practical applications in the technical arts including delivering multiple conference calls together to create a seamless personalized conferencing experience to a specific participant. A multimedia conference server allows a participant to provide input at two or more conferences that are conducted at the same time via a unified conferencing interface.

In a first aspect, a set of computer-useable instructions executed by a processor on a multimedia conferencing server provides an illustrative method for transmitting a data stream to the participant's communication device. The data stream is associated with several multimedia conferences where the participant is active. The communication device obtains the data stream and renders the data stream in accordance with preferences associated with the participant. In turn, the communication device may automatically switch between the multimedia conferences based on the participant preferences that define the relative importance of the concurrent multimedia conferences. In one embodiment, the data stream may include notifications that are generated based on preferences selected by the participants. The multimedia conferencing server may include the notifications in the data stream transmitted to the participant. Accordingly, a participant that is a subject matter expert may be actively engaged in several multimedia conferences that are scheduled to occur around the same time. For instance, a subject matter expert may be in one multimedia conference when a second multimedia conference begins prior to the end of the first multimedia conference. Thus, the subject matter expert is able to utilize the multimedia conference server to conduct the first and second multimedia conference in parallel.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Figure 1:
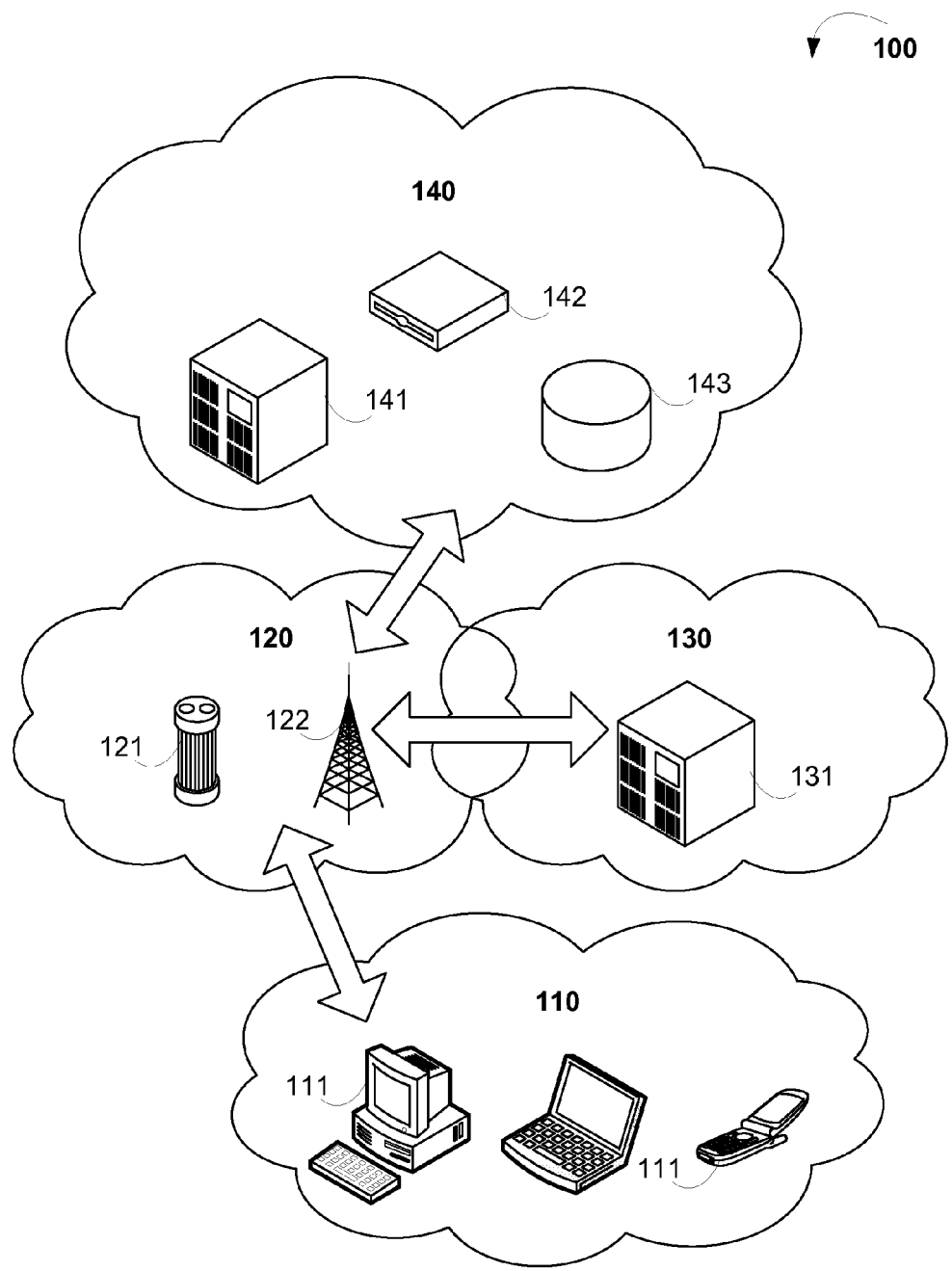
FIG. 1 is a network diagram of an exemplary network environment suitable for implementation of embodiments of the invention.

The subject matter of embodiments of the invention is described with specificity herein to meet statutory requirements. But the description itself is not intended to necessarily limit the scope of the claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention provide computer systems, computer-implemented methods, and computer media for parallel multimedia conferencing via a multimedia conference server. In a globally connected economy, it is very rare that a group of people, e.g., personnel resources working on a project, will be physically located together. These personnel resources rarely gather together in a room to share ideas or to discuss the project. Today, in a geographically disperse work environment, multimedia conference calls are a critical part of gathering highly skilled personnel resources together during troubleshooting activities and investigation activities. The multimedia conference calls allow the group of people to collaboratively communicate with one another without being physically located together.

In some embodiments, the personnel resources may utilize a VOIP client on their personal computer, laptop, or wireless device to participate in several multimedia conferences from a specified geographical location, e.g., office cubical, home office, car, etc. A multimedia conference server is configured to provide personalized notifications to participants of the multimedia conferences. The multimedia conference server, also, allows seamless switching between multiple multimedia conference calls that a participant is actively involved in.

In one embodiment, a participant may receive a notification regarding one or more multimedia conference calls based on preferences established by the participant. For instance, the participant may establish a preference to be notified when specific keywords, phrases, etc., are identified via a multimedia recognition algorithm that looks for the keywords or phrases in the content produced by the multimedia conference calls. The keywords or phrases may inform the participant that a response on a specific multimedia conference call is required. Thus, the multimedia conference server allows a participant to be actively involved in multiple multimedia conference calls. The multimedia conference server may provide status information for each of the multimedia conference calls. The status information may include length of time a multimedia conference call has been conducted, an indication of whether an individual is currently speaking, an indication of which of the multimedia conference calls satisfy the keyword or phrase preference, and an indication of the length of time a certain participant has been connected to the multimedia conference call. In some embodiments, the status information may be transmitted to the participant's computing device for display.

The multimedia conference calls—herein referred to as multimedia conferences—associated with the participant are displayed on the communication device in a graphical user interface. The graphical user interface may include a region for each of the multimedia conferences currently associated with the participant. The communication device may also render a transcription of the content associated with each of the multimedia conferences in the corresponding region of the display. In some embodiments, the audio associated with the content may be produced via audio equipment, e.g., speakers or headphones, as foreground audio content or background audio content based on a priority assigned to the multimedia conference by the participant. In certain embodiments, the priority assigned to the multimedia conference may change dynamically when the content of one or more of the multimedia conferences matches the keywords or phrases included in the preferences of the participant. Accordingly, the multimedia conference server enables an individual participant to attend multiple multimedia conferences that occur around the same time. The individual participant may be provided with a graphical user interface that allows the participant to interact with multiple multimedia conference calls. Moreover, the high priority content may be rendered in a foreground position in the audio and graphical productions. The remaining content may be rendered in the background positions in the audio and graphical productions.

In some embodiments, the participants may interact in parallel with the multimedia conference calls via audio and text. For instance, the multimedia conference associated with foreground position may receive audio content from the participant. The multimedia conferences associated with the background position may receive text content from the participant. In some embodiments, the text content may be reformatted to audio content by the participant's computing device and delivered to the multimedia conferences associated with the background position. The multimedia conference server may provide transcription services for each of parallel multimedia conferences. Accordingly, the participant may receive a transcript of the multimedia conferences that the participant is involved in.

Throughout the description of the embodiments of this invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the embodiments of the invention. Further, various technical terms are used throughout this description.

The following is a nonexhaustive list of these acronyms:

| | |
|---|---|
| 3G | Third-Generation Wireless Telephone Technology |
| 4G | Fourth-Generation Wireless Telephone Technology |
| BSC | Base Station Controller |
| CDMA | Code Division Multiple Access |
| CD-ROM | Compact Disk Read Only Memory |
| DVD | Digital Versatile Discs |
| EEPROM | Electrically Erasable Programmable Read Only Memory |
| EVDO | Evolution Data Only |
| GPRS | General Packet Radio Service |
| GSM | Global System for Mobile Communications |
| iDEN | Integrated Digital Enhanced Network |
| IM | Instant Messaging |
| IP | Internet Protocol |
| I/O | Input/Output |
| MMS | Multimedia Messaging Service |
| PC | Personal Computer |
| PAM | Position Awareness Management |
| PCS | Personal Communications Service |
| PDA | Personal Digital Assistant |
| POTS | Plain Old Telephone System |
| PTT | Push To Talk |
| RAM | Random Access Memory |
| ROM | Read Only Memory |
| SMS | Short Message Service |
| TDMA | Time Division Multiple Access |
| UMTS | Universal Mobile Telecommunications Systems |
| VOIP | Voice Over Internet Protocol |

-continued

| | |
|---|---|
| WI-FI | Wireless Fidelity |
| WiMAX | Worldwide Interoperability for Microwave Access |

Embodiments of the invention may be embodied as, among other things: a method, system, or computer-program product. Accordingly, the embodiments may take the form of a hardware embodiment, a software embodiment, or an embodiment combining software and hardware. In one embodiment, a computer-program product includes computer-useable instructions for the method and is embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

In one embodiment, a parallel multimedia conferencing system includes parallel multimedia conference servers and parallel multimedia conference agents. The parallel multimedia conference agents are available on computing devices, e.g., laptops, wireless devices, and personal computers. The parallel multimedia conference servers and parallel multimedia conference agents are deployed in communication networks to provide a participant with access to multiple multimedia conferences simultaneously. Thus, a participant may communicate across two or more multimedia conferences that are being conducted concurrently.

FIG. 1 is a network diagram of an exemplary network environment 100 suitable for implementation of embodiments of the invention. The network environment 100 includes a client network 110, a wireless communication network 120, a public-switched telephone network 130, and a multimedia conferencing system network 140.

The network environment 100 illustrates the multimedia conferencing system network 140, which provides a communication device 111 of the client network 110 access to multiple multimedia conferences maintained by multimedia conferencing system network 140. The multiple multimedia conferences are accessible via the communication device 111. The user utilizes the communication device 111 to participate concurrently in the multiple multimedia conferences. The client network 110 may include several communication devices 111 that a user may utilize to communicate in the multimedia conferences.

The client network 110 includes communication device 111 that the user interacts with to establish a communication session. The client network 110 may be a local network or a personal area network. In some embodiments, the communication devices 111 may utilize client network 110 to share information with each other. For instance, the client network may be utilized to share contact information or calendar information associated with each of the communication devices 111. The client network may be a secure private network that is only accessible by the user that utilizes the communication devices 111.

The communication devices 111 may include personal computers, laptop computers, netbooks, tablets, wireless devices, analog devices, etc. For instance, a communication device 111 may initiate a first multimedia conference. In one embodiment, the first multimedia conference may be initiated over the public-switched telephone network 130. The communication device 111 may wirelessly connect to a base station 122. The base station 122 may route the multimedia conference to the public-switched telephone network 130. While the communication device is connected to the multimedia conference and the user is participating in the multimedia conference, the user may request that communication device 111 initiate a second multimedia conference. The communication device 111 may display a dialog box that inquires whether the user intends to initiate parallel multimedia conferences. If the user indicates that parallel multimedia conferences are requested, a parallel multimedia conference agent on the communication device 111 may request that the multimedia conferencing server 141 initiate two concurrent multimedia conferences using the conferencing information provided by the user. In turn, the parallel multimedia conference agent may terminate the first multimedia conference that is connected to the public-switched telephone network. If the user indicates that a second multimedia conference is requested without using the parallel multimedia conference agent, the communication device may create a second multimedia conference on the public-switched network. The first and second multimedia conferences would be unable to access the features of the parallel multimedia conferencing system including the parallel multimedia conferencing agent and the parallel multimedia server 141. In an alternate embodiment, the parallel multimedia conferencing agent of the communication device 111 may present a dialog box to the user of the communication device 111 when the first multimedia conference is initiated to inquire whether the user desires to utilize the feature-rich parallel multimedia conference server 141 as opposed to the public-switched network 130. If the user selects the public-switched network 130, the communication device 111 would be unable to access the features of the parallel multimedia conferencing system during the first multimedia conference. If the user selects the feature-rich parallel multimedia conference network 140, the communication device 111 would be able to access the features of the parallel multimedia conferencing system during the first multimedia conference.

The wireless network 120 provides access to radio and cellular routing devices. These routing devices allow a communication device 111 to wirelessly transmit data to a recipient. In some embodiments, the routing devices include Wi-Fi routing devices and WiMax routing devices. For instance, the communication device 111 may connect to base stations 122 or wireless access points 121 to transmit the data associated with multimedia conferences. The wireless access points 121 may be configured to route the data wirelessly on the Wi-Fi network. The base stations 122 may be configured to route the data wirelessly on the WiMax network. In turn, the routing devices may route the data to the public-switched network 130 or the parallel multimedia conferencing system network 140.

The public-switched telephone network 130 provides access to the analog communication devices 111. The public-switched telephone network 130 includes conferencing bridge 131. The conferencing bridge 131 is configured to connect communication devices 111, including analog communication devices to a multimedia conference. The public-switched telephone network 130 may receive a multimedia conference request from a communication device 111. In turn, the public-switched telephone network 130 creates a connection between the communication device 111 and a conferencing bridge 131 provided by the public-switched network 130 that connects analog communication devices. The analog communication devices connected to the conferencing bridge 131 are able to participate in the multimedia conference requested by the communication device 111. The conferencing bridge 131 is not configured to provide parallel multimedia conferencing to any participant of the multimedia conference. In some embodiments, the parallel multimedia conferencing server 141 may communicate with the public-switched telephone network 130 to proxy connections on behalf of a parallel multimedia conference bridge that connects to analog communication devices. In other words, the conferencing bridge 131 may operate as a proxy for the parallel multimedia conference bridge. Here, the multimedia conference established by the communication device may access the features of the parallel multimedia conferencing server 141. In other embodiments, the parallel multimedia conference bridge is configured to connect to each of the communication devices 111, including the analog communication devices without utilizing the public-switched telephone network 130 or the conferencing bridge 131. Again, the parallel multimedia conference bridge allows the participants to access the features of the parallel multimedia conferencing server 141.

The multimedia conferencing system network 140 allows the communication devices 111 to concurrently participate in multiple multimedia conferences. The multimedia conferencing system network 140 includes parallel multimedia conferencing server 141, rules engine 142, and database 143. In some embodiments, the parallel multimedia conferencing server 141, the rules engine 142, and the database 143 may be components of a single server device.

The parallel multimedia conferencing server 141 is configured to establish a connection between the communication devices and a parallel multimedia conferencing bridge 131 in response to a request to initiate a multimedia conference. In some embodiments, the parallel multimedia conferencing server 141 provides multimedia recognition functionality during the multimedia conference. The multimedia recognition includes speech recognition, text recognition, etc. The parallel multimedia conferencing server 141 may parse the speed recognition and text recognition data for keywords and phrases. The keywords and phrases are transmitted to the rules engines 142 to trigger appropriate actions, e.g., generate notifications, change priority, highlight text in transcript, etc. In some embodiments, the parallel multimedia conferencing server 141 may also provide real-time transcription services for the multimedia conference call. For instance, the parallel multimedia conferencing server 141 may receive audio associated with a participant of the multimedia conference call, identify the participant, and generate a transcript that includes an identifier associated with the participant and text corresponding to the audio received from the participant.

The rules engine 142 applies rules associated with a participant of the multimedia conference server 141. In one embodiment, the rules may include criteria and actions specified by the participant during conference call setup. In turn, the rules engine 142 may access a rule stored in database 143. The rules in the database 143 may be associated with an account established by the participant. In addition to the rules, the database 143 may store additional account data for the participant. The additional account data may include any of the following: device capabilities, authentication information, billing information, log-in information. Thus, in other embodiments, the rules having criteria and actions may be retrieved from database 143 based on account information received from the participant.

The rules engines 142 is configured to personalize notifications, filter content from each of the multimedia conferences associated with the participant, and multiplex together each of the multimedia conferences. For instance, the rules engine 142 may allow the participant to specify keywords and phrases that must be included in the multimedia conference data that is transmitted to the user. For instance, the participant may create a rule that establishes keyword criteria that must always be included in the multimedia conference data transmitted to the participant. The rule may indicate that when the name of the vice president or chief technology officer is identified in the multimedia recognition data, the rules engine 142 must highlight the text surrounding the name or generate an audible notification. In other embodiments, the rule may include an action that increases a priority of the multimedia conference associated with multimedia recognition data having the name of the vice president or chief technology officer and decreases a priority of other concurrent multimedia conferences that have not recently mentioned the name of the vice president or chief technology officer.

The rules engine 142 may provide actions that include, among other actions, mute audio, unmute audio, change volume, move to background, move to foreground, initiate another multimedia conference, generate notifications, change icon, create SMS, establish priority for multimedia conference, multiplex selected multimedia conferences in a single data stream, translate transcript to language selected by participant, etc. The user may include various criteria to trigger the actions provided by the rules engine 142. The criteria may include keywords or phrases extracted from the multimedia recognition data, dates extracted from calendar data associated with the participant, capabilities of the communication device 111 currently utilized by the participant, and the like.

The database 143 stores rules or account information for the participants of the multimedia conferences. The database 143 may store the rules or account information for a specified period of time selected by the participants. For instance, the database 143 may include an identifier for each participant of a multimedia conference. The identifier may be generated by the database. In turn, the database may associate log-in information, billing information, rules, and the like with the identifier. The rules engine 143 may access the rules for each participant to determine preferences associated with the participant and to determine the actions that are triggered for the participant. For instance, the rules may indicate that a first participant of the multimedia conference has selected the following criteria: when the word "Mike" is included in the recognition data, with the following action: generate a notification that is delivered by SMS message to the first participant. The rules may indicate that a second participant of the multimedia conference has selected the following criteria: when the words included in the recognition data are in Spanish, generate an English transcript that is delivered to the second participant. Accordingly, when the multimedia recognition data provided by the multimedia conference server 141 includes the word Mike, the parallel multimedia conference server 141 generates an SMS message to notify the first participant that the selected keyword is included in the multimedia conference recognition data. When the multimedia recognition data provided by the multimedia conference server 141 includes the Spanish words, the parallel multimedia conference server 141 generates an English transcript for the Spanish words.

The illustrated elements of network environment 100 are meant to be exemplary in nature, and the various lower-level details of the elements are not elaborated on so as to not obscure the embodiments of the invention. Clearly, some of the elements may be absent in some embodiments of the invention, and additional elements not shown may also be part of network environment 100. Attempting to show all of the various elements of network environment 100 would obscure certain novel aspects, and we will refrain from such elaboration at least for the sake of brevity.

A communication device that is utilized to connect to a parallel multimedia conferencing server may include various components. For instance, the communication device may include a processor and storage components that are utilized by a parallel multimedia conferencing agent to establish a multimedia conferencing bridge. In one embodiment, the parallel multimedia conferencing agent may adapt the multimedia conference data for delivery to the communication device based on the capabilities of the communication device. The communication device may input components, such as keyboards, stylus, audio capture, image capture, or video capture components that capture a place, person, event, or thing. The input component creates content that may be transmitted across a communication network that the communication device is connected to.

Figure 2:
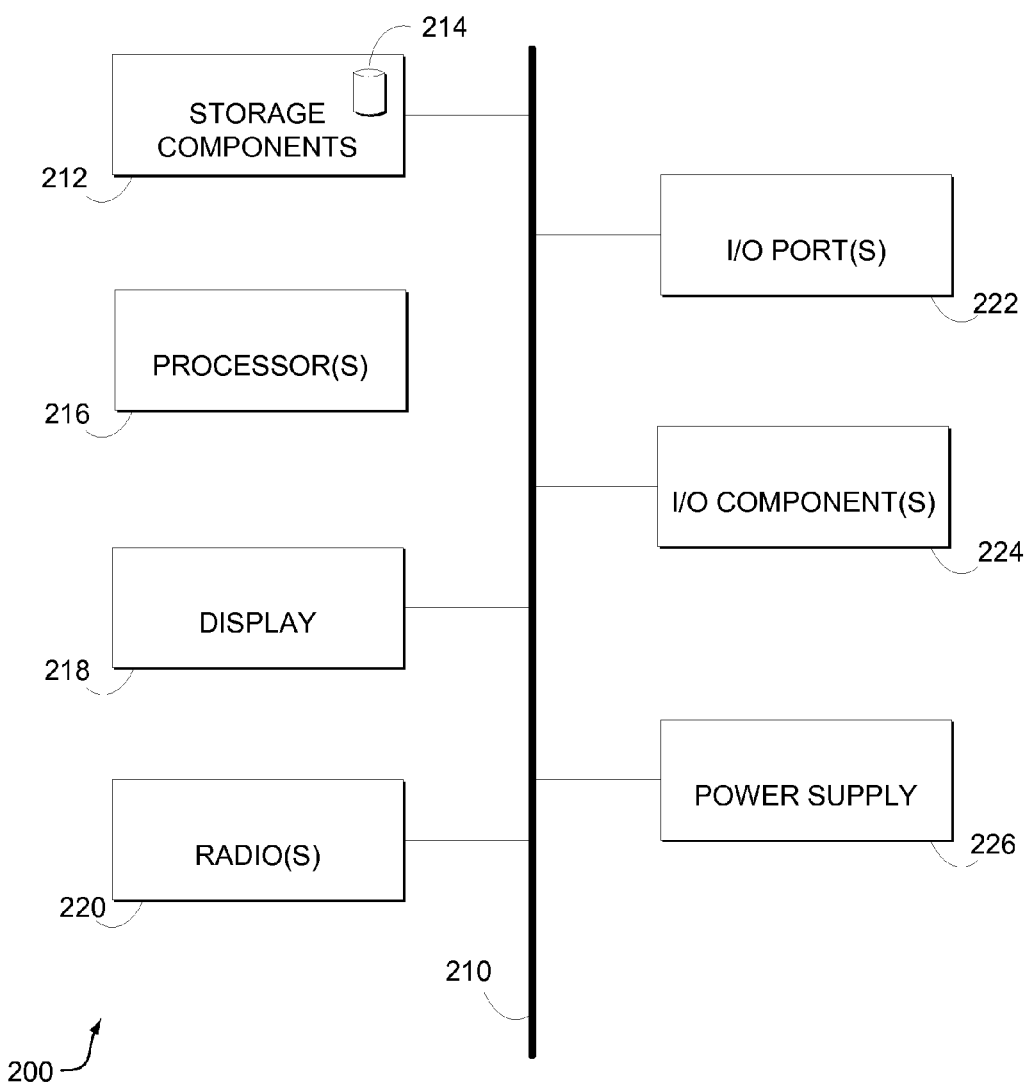
FIG. 2 is a block diagram of an exemplary communication device that is suitable for operation with embodiments of the invention.

FIG. 2 is a block diagram of an exemplary communications device 200 that is suitable for operation with embodiments of the invention. The communication device 200 includes, among other components, a bus 210, storage 212, processors 216, display 218, radio 220, I/O ports 222, I/O components 224, and power supply 226. In some embodiments, the communication device 200 may be an analog phone with a speaker component, a receiver component, and a transmitter component. The analog phone may be powered by an external source. FIG. 2 depicts the components that will generally be included in the communication device 200 to facilitate various functional aspects of the embodiments of the invention. As shown, the bus 210 couples, directly or indirectly, the following illustrative components: the storage component 212, the processor 216, the display 218, the radio 220, the I/O ports 222, the I/O components 224, and the power supply 226.

Storage components 212 may take the form of the aforementioned computer-readable media. As with all of the illustrative components of FIG. 2, although we refer to them sometimes in the singular, that should not be read as to imply that only a single of each of the components is contemplated within the scope of our invention. To the contrary, by way of example, storage component or components 212 may actually be composed of constituent storage components located within communication device 200. A portion or separate storage component includes data store 214. In one embodiment, as will be explained above, data store 214 can be used to store the format handlers for the content of the multimedia conference, capabilities of the communication device 200, rules associated with each multimedia conference that a user of the communication device is participating in, and computer-usable instructions for the parallel multimedia conferencing agent that may be executed by the communication device 200.

The capabilities of the communication device 200 may be stored in data store 214 with an indication of whether the communication device 200 is currently configured to support VOIP, IM, PAM, video, text, SMS, PTT, etc. In some embodiments, the indication may be a Boolean identifier, where "0"

indicates that the capability is not supported and "1" indicates that the capability is supported.

Processors 216 facilitate a flow of information among all or a portion of the components shown in FIG. 2 as well as executing computer-usable instructions that facilitate various aspects of the embodiments of the invention. For example, in one embodiment, the computer-usable instructions for the parallel multimedia conferencing agent are executed by the processor 216 of the communication device 200 to coordinate various functional aspects of the embodiments of the invention. Processors 216 may utilize the parallel multimedia conferencing agent to create multimedia conference connections, to generate dialog boxes that inquire whether the user desires to establish a connection with the parallel multimedia conferencing server, to render a graphical user interface for the content of the one or more multimedia conferences and transcripts associated with the one or more multimedia conferences. Processor 216 might actually be multiple processors that receive instructions and process them accordingly.

In certain embodiments, the parallel multimedia conferencing agent is a thin client that resides on the communication device 200. In other embodiments, the parallel multimedia conferencing agent may be a component that is connected to communication device 200. The parallel multimedia conferencing agent may utilize the available components displays, speakers, etc., to provide rich multimedia conferencing services, e.g., transcription services, notifications, etc. In one embodiment, when the communication device is an analog device and may be limited to receiving audio, the parallel multimedia conferencing agent may reformat transcription data, etc., as audio content that may be replayed at a speed specified by the user via the communication device. For instance, the user may utilize a phone keypad of the communication device 200 to make selections and to switch between multimedia conferences. Additionally, the user may receive audible notifications, e.g. alarms, when a rule specified by the participant is satisfied. Accordingly, the communication device 200 may be any of the following: smart phones, tablets, personal computers, POTS devices, etc. The parallel multimedia conferencing agent adapts the content associated with the multimedia conference for delivery to the communication device based on the current capabilities of the communication device 200. In one embodiment, the capabilities of the communication device 200 may be updated when plug-and-play components or new equipment is installed on the communication device 200. In other embodiments, the capabilities of the communication device 200 may be updated when new format handlers of the content of the multimedia conferences are installed on the communication device 200.

Display component 218 includes the likes of a monitor, a speaker, as well as other components that can present information (such as a lamp (LED), or even lighted keyboards). The display component 218 may be utilized to render content associated with one or more multimedia conferences concurrently. In some embodiments, the content may be rendered via speakers only. In other embodiments, the content may be rendered via speakers and a monitor simultaneously. The speakers may render the audio associated with the multimedia conference. The speakers may render the content based on the priorities associated with the multimedia conferences. For instance, the priorities for two multimedia conferences may be established automatically or based on user feedback. The priorities may be established using rules associated with the user of the communication device 200. The first multimedia conference may be conducted by the Chief Financial Officer, who may be discussing budget issues for a project. The second multimedia conference may be delivered by a technician, who may be discussing training for a network application. The rules associated with the user may specify that any multimedia conference given by the Chief Financial Officer takes priority over other multimedia conferences. Thus, the parallel multimedia conferencing agent checks the content associated with multimedia conferences to determine whether the appropriate positions are applied to the content. The parallel multimedia conferencing agent checks the foreground position to ensure that the first multimedia conference is in the foreground position. Also, the parallel multimedia conferencing agent checks the background position to ensure that the second multimedia conference is in the background position. If the first and second multimedia conferences are in the correct positions, the parallel multimedia conferencing agent renders the content on the speakers at the selected audio level for the foreground position and the background position. The foreground positions may be reproduced at a higher volume than the background position. At any time during production of the content, the user may override the priorities or the volumes assigned to the multimedia conferences by selecting the multimedia conference and decreasing or increasing the volume associated with the content.

The monitor may render the transcript data and a graphical user interface for the multimedia conferences. Like the speakers, the monitor may also render the content based on priorities assigned to the multimedia conferences. For instance, the parallel multimedia conferencing agent checks the content associated with multimedia conferences to determine whether the appropriate positions are applied to the content and transcripts. The parallel multimedia conferencing agent checks the foreground position to ensure that the first multimedia conference is in the foreground position. Also, the parallel multimedia conferencing agent checks the background position to ensure that the second multimedia conference is in the background position. If the first and second multimedia conferences are in the correct positions, the parallel multimedia conferencing agent renders the content on the monitors at the selected size and position for the foreground position and the background position. The foreground positions may be reproduced at a size, position, or resolution, different than the background position. The foreground position may be associated with high-priority content. Accordingly, the transcripts and graphical user interfaces associated with multimedia conferences may be displayed based on the assigned priorities. Again, the user may override the size, position, and resolution for the content of the multimedia conferences rendered on the monitor. In some embodiments, the monitors may include present graphical indicators associated with each of the active multimedia conferences. The graphical indicators, e.g., icons, may change color depending on the content corresponding to the multimedia conference. In one embodiment, when the content satisfies a preference or rule associated with the user, the graphical indicator may change to a green color. Otherwise, the graphical indicator is a gray color. In some embodiments, the parallel multimedia conferencing agent may determine that the communication device 100 is not capable of presenting a graphical indicator via a graphical user interface on the monitor. Instead, the parallel multimedia conferencing agent may determine the communication device is equipped with a lamp. Here, the parallel multimedia conferencing agent may utilize the lamp to provide a notification that a rule is satisfied. In one embodiment, the light may change color or blink when the rule satisfied. In other embodiments, when the communication device is an analog device or a limited bandwidth device, the parallel multimedia conferencing agent may request that the content parallel multimedia conferencing server format the content from the multimedia conferences in a lower audio quality or that the multimedia conference data includes audio data only for devices that are capable of only receiving audio associated with the multimedia conference.

Radios 220 facilitate the communication of wireless communication signals to and from communication device 200. Illustrative protocols that can be utilized in connection with an embodiment of the present invention include, but are not limited to, Global System for Mobile Communications (GSM); General Packet Radio Service (GPRS); Code Division Multiple Access (CDMA), CDMA2000, CDMAOne; Time Division Multiple Access (TDMA); Universal Mobile Telecommunications Systems (UMTS); Integrated Digital Enhanced Network (iDEN); WiMAX, 3G, 4G, and Personal Communications Service (PCS); Evolution Data Only (EVDO); etc. The radios 220 facilitate wireless communications between the communication device 200 and a national or even global telecommunications network.

For instance, the networks may include a cable network, public-switched telephone network, a wireless network (e.g., a wireless telecommunications network), or a combination thereof or portions thereof. A wireless telecommunications network refers to any type of telecommunications network that is wireless. A wireless telecommunications network might include an array of devices, which are not shown so as to not obscure more relevant aspects of the invention. Components such as a base station controller (BSC), a communications tower, or even access points (as well as other components) can provide wireless connectivity in some embodiments. In some embodiments, radio 220 might also facilitate other types of wireless communications including Wi-Fi communications and GIS communications. In one embodiment, the radio 220 is utilized by the parallel multimedia conferencing agent to share capabilities of the communication device 200 with the parallel multimedia conferencing server. In some embodiments, the parallel multimedia conferencing server may execute a registration application when the communication device 200 attempts to initiate a multimedia conference. The registration may include receiving, at the parallel multimedia conferencing server, current capabilities of the communication device 200; preferences and rules for the user of the client devices; and personal data: name, profession, security clearances, voice profiles for the user. In some embodiments, the capabilities of the communication device 200 may be exchanged during a handshake between the communication device 200 and the parallel multimedia conferencing server. During the handshake, the communication device 200 may inform the parallel multimedia conferencing server that the communication device 200 is operating in a reduced functionality mode and has disabled several components based on limited bandwidth reported by the radio 220. The communication device 200 may also provide, during the handshake, a message that includes an indication of whether the speakers are configured for mono, low fidelity, or high fidelity for the audio. In some embodiments, the communication device 200 may also provide a maximum or minimum playback speed that is supported by the communication device 200.

Input/output ports 222 provide a way for communication device 200 to interact with other peripheral components. Illustrative input/output ports include an earpiece or headphone jack, a USB port, an infrared port, and the like. Different input/output ports could be provided as is needed to facilitate communication of other peripheral components.

Input/output components 224 include items such as keyboards, microphones, touch screens, external displays, lamps, external storage, and any other item usable to directly or indirectly input data into communication device 200. In one embodiment, input/output components 224 include a vibrating component that enables communication device 200 to experience a vibrating action incident to an occurrence of different events. The vibrating component may take on a variety of forms, such as a motor that operates with an offset mass. In one embodiment, vibrating component 224 takes the form of a haptics motor. In certain embodiments, the communication device 200 is provisioned with format handlers associated with a plurality of codecs that are utilized by the parallel multimedia conferencing server to encode audio or video data. Any updates may be reported by the communication device 200 to the parallel multimedia conferencing server if the update on the communication device 200 occurs after the registration or the handshake. For instance, adding external components, or reducing functionality by removing or powering off external or internal components of the communication device 200, may be communicated as updates to the parallel multimedia conferencing server.

Power supply 226 may also take on a variety of forms ranging from a battery to a charging mechanism to other forms of power sources that serve to provide power to communication device 200. Power supply 226 includes items such as batteries, fuel cells, or any other component that can act as a power source to power communication device 200.

It will be understood and appreciated by those of ordinary skill in the art that the communication device 200 shown in FIG. 2 is merely an example of one suitable communication device 200 and is not intended to suggest any limitation as to the scope of use or functionality of the embodiments of the invention. Neither should the communication device 200 be interpreted as having any dependency or requirement related to any single component or combination of components illustrated therein. The single unit depictions are meant for clarity, not to limit the scope of embodiments in any form.

A parallel multimedia conference system may provide parallel multimedia conferences to participants of the multimedia conferences. The content associated with multimedia conferences may be transmitted to communication devices associated with the participants. In some embodiments, the multimedia conference may be assigned priorities based on content or location data associated with multimedia conferences and location data associated with the participant. The parallel multimedia conference system may increase a priority assigned to a multimedia conference for a participant if the location of the participant is the same as, or close to, a location associated with a moderator of the multimedia conference. In other embodiments, the parallel multimedia conference system may increase a priority assigned to a multimedia conference for a participant if the location of the participant is the same as, or close to, a location associated with a majority of participants of the multimedia conference.

Figure 3:
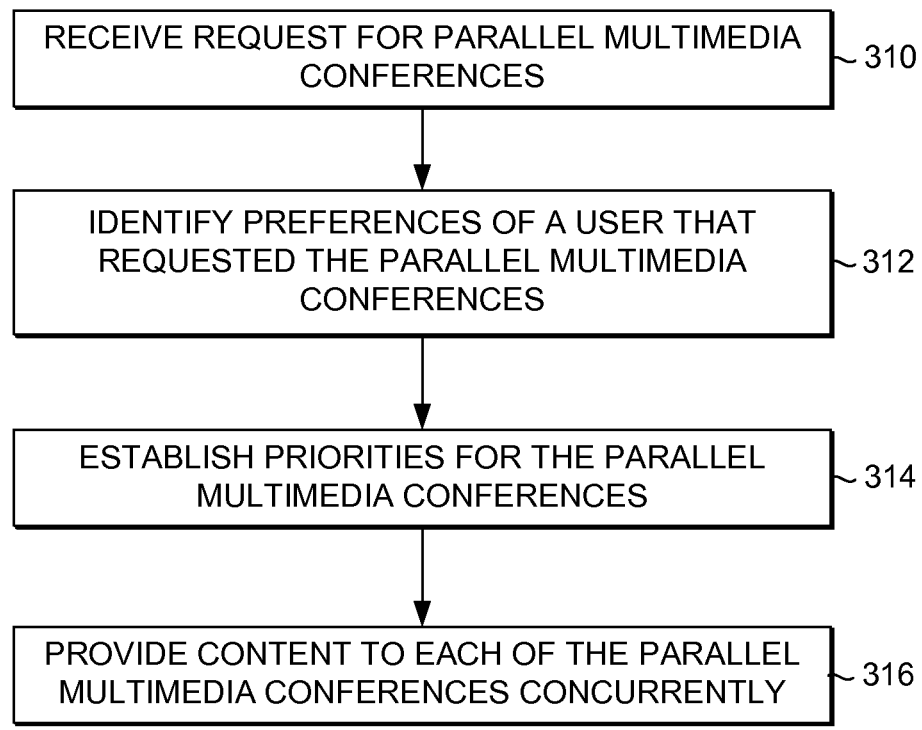
FIG. 3 is a flow diagram showing an illustrative method of providing parallel multimedia conferences in accordance with embodiments of the invention.

FIG. 3 is a flow diagram showing an illustrative method of providing parallel multimedia conferences in accordance with embodiments of the invention. A parallel multimedia conference system may receive a request to initiate parallel multimedia conferences, in step 310. In some embodiments, the request is based on calendar data on the user's computing device. The request may include notification criteria specified by the user.

In one embodiment, the communication device, e.g., VOIP phone, may establish a first VOIP conference over the PSTN. In turn, the VOIP phone may issue a subsequent request to initiate a second VOIP conference for the user of the communication device. At this point, a parallel multimedia conference may intercept the subsequent request and provide a dialog box to inquire whether the user intends to initiate parallel multimedia conferences. If the user responds negatively, the second VOIP conference is created and the user conducts two VOIP conferences. If the user responds affirmatively, the parallel multimedia conference system generates two parallel multimedia conference connections and the participants of the first and second VOIP conference are moved to a first and second multimedia conference maintained by the parallel multimedia conference system. The first and second multimedia conferences maintained by the parallel multimedia conference system are utilized by the user of the communication device. Thus, the user may utilize the parallel multimedia conference system to reconnect to one or more conferences previously initiated via the PSTN. In other embodiments, the PSTN and parallel multimedia conference system may share in maintaining the multimedia conferences.

In yet another embodiment, the user may transfer multimedia conferences between multiple communication devices belonging to the user. An additional communication device may be transferred session information associated with the multimedia conference while the user is disconnecting from the session on a first communication device. The session management provided by the parallel multimedia conference system allows seamless session context transfers. For instance, a user may have a smart phone and a laptop. The user may initiate at least two parallel multimedia conferences on the smart phone. While the user is participating in the at least two parallel multimedia conferences, the user may initialize the laptop and attempt to reconnect to the at least two parallel multimedia via the laptop. The parallel multimedia conference system may ask the user if a new session is requested or if the user desires to transfer the previous sessions to the laptop. If the user responds negatively, the parallel multimedia conference system creates a new connection to the at least two multimedia conferences for the laptop. If the user responds affirmatively, the parallel multimedia conference system transfers the at least two multimedia conferences from the smart phone to the laptop. In one embodiment, when the user responds affirmatively the user may indicate that content histories associated with the at least two multimedia conferences should be available on the laptop. After the session transfer, the laptop may request history information corresponding to communications that previously occurred on the at least two or more multimedia conferences. The history information may include transcripts, audio, or video previously made available to the smart phone.

In step 312, the parallel multimedia conference system, in certain embodiments, identifies preferences of a user that requested the parallel multimedia conferences. In turn, priorities may be established by the parallel multimedia conference system for the parallel multimedia conferences based on preferences of the user and activity associated with each of the parallel multimedia conferences, in step 314. In some embodiments, the preferences may include priorities for multimedia conferences, preferred content formats, keywords, and rules for transmitting the parallel multimedia conferences. The preferences may also identify transcription service formats and audio formats for audio content associated with the parallel multimedia conferences. The preferences may specify volume levels associated with the priorities. For instance, the parallel multimedia conference system may receive voice profile for participants from each of the multimedia conferences. The voice profile includes a cadence and pitch that may be utilized to generate a voice signature. The voice signature may be utilized by the parallel multimedia conference system to identify participants that speak on the multimedia conferences. The voice profiles are also utilized by the parallel multimedia conference system to generate speech recognition data that includes textual data corresponding to audio for the multimedia conferences. For instance, the speech recognition data may be parsed to extract keywords that satisfy criteria provided by the participants. The recognition data may include an indication of whether the participant speech data is characterized as stressed, excited, disappointed, etc. The keywords may include a name of a person, name of a company, name of a product, title, or any other phrase. The keywords may include terms like "boss," "executive," "president," etc. If the parallel multimedia conference system identifies the keywords, a corresponding action, like send SMS message, send audible notification, or send visible notification, may be performed. In some embodiments, the parallel multimedia conference system provides transcription based on the recognition data and the voice signature.

In one embodiment, the priorities may indicate foreground and background presence for the parallel multimedia conferences. One of the parallel multimedia conferences may be associated with a foreground position and the remaining parallel multimedia conference may be associated with a background position. In certain embodiments, the priorities may be dynamically adjusted by the parallel multimedia conference system based on the content of the parallel multimedia conferences and the preferences of the user.

In step 316, the parallel multimedia conference system provides content to each of the parallel multimedia conferences concurrently. In one embodiment, the parallel multimedia conferences may include any combination of voice or video. Moreover, the content may be configured in a single stream of data that includes content for each of the parallel multimedia conferences the user is participating in. In yet another embodiment, the content of the parallel multimedia conferences may be transmitted in the format selected by the user to the communication device. The format selected by the user may be dynamically updated based on existing capabilities of the computing device currently utilized by the user.

In still another embodiment, the communication device is configured to participate in one or more parallel multimedia conferences. The communication device may communicate concurrently in the parallel multimedia conferences. The communication device may have authority to make changes to transcripts associated with the multimedia conferences or to drop participants from the multimedia conferences. The communication device may receive a single data stream associated with multiple parallel multimedia conferences. The communication device may utilize rules to determine where and how to reproduce content associated with the multiple parallel multimedia conferences. The rules may indicate that a lamp should blink to inform the user that an important keyword was recently used in at least one of the multimedia conferences or that a volume associated with a multimedia conference using the keyword should increase from mute or whisper to unmute or loud.

Figure 4:
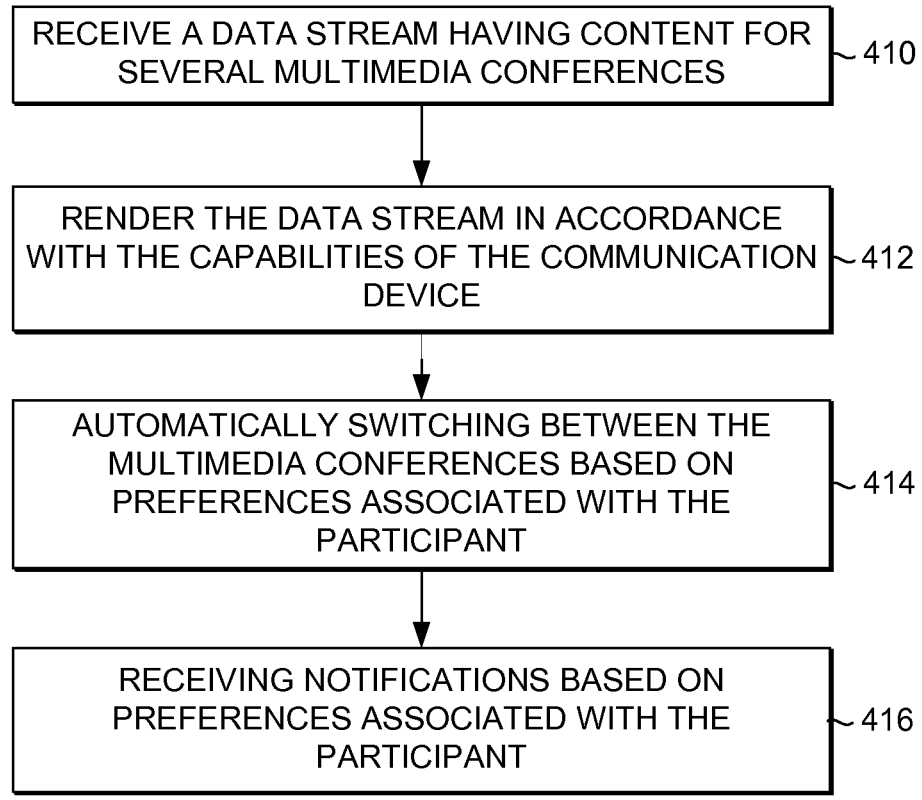
FIG. 4 is another flow diagram showing another illustrative method of rendering the parallel multimedia conferences in accordance with embodiments of the invention.

FIG. 4 is another flow diagram showing another illustrative method of rendering the parallel multimedia conferences in accordance with embodiments of the invention. In step 410, the communication device receives a data stream for one or more multimedia conferences. The communication device may render the data stream in accordance with the capabilities of the communication device, in step 412. For instance, a device without a display would drop the graphical content. In some embodiments, the data stream received from the parallel multimedia conferencing system may not include the graphical content. In other embodiments, the data stream may include transcripts for multimedia conferences. The multimedia conference transcripts are a written transcript of the audio transmitted on the multimedia conferences. The multimedia conference transcripts allow participants joining or rejoining the multimedia conference to receive a chronological readout of what transpired prior to the participant joining or rejoining. In some embodiments, the communication device may receive audio snippets associated with keywords identified in the multimedia conferences. In other embodiments, the audio may include all the content associated with multimedia conferences. Optionally, the communication device may also receive personalized transcripts that capture the content provided by the participant on the multiple multimedia conferences. The personalized transcript may include sections that correspond to each of the multimedia conferences. The personalized transcripts may be utilized in local status reports, configuration management, journals, etc. In some embodiments, unknown participants are not recognized by the parallel multimedia conferencing system and some participant may be incorrectly associated with participant names. The communication device may edit the personalized transcripts and the conference call transcripts. The edits made by the user are then localized edits that are available only to the user of the communication device. In other embodiments, the user may share edits made to the transcript to the parallel multimedia conferencing system. When the edits associated with a name selected by the parallel multimedia conferencing system pass an edit threshold and the number of edits that have the same name is above the sameness thresholds, the name selected by the parallel multimedia conferencing system is changed to a name included in the edits that are numbered above the sameness threshold. In turn, the parallel multimedia conferencing system may utilize the updated name for subsequent transcript data and rule analysis to determine whether criteria are satisfied. In at least one embodiment, attendee information associated with a calendar entry may be utilized by the parallel multimedia conferencing system to identify speakers. In other embodiments, the participant of the multimedia conference may utilize the communication device to obtain a list of possible identifiers that may be associated with the unknown voice or the incorrectly identified speaker.

In turn, the communication device may automatically switch between multimedia conferences based on preferences of the participant, in step 414. In step 416, the communication device may also receive notifications from the parallel multimedia conferencing system based on preferences associated with the participant when those preferences are satisfied by the content of the multimedia conferences. The notifications may include blinking, changing of volumes, receiving SMS message, receiving PTT messages, etc.

Embodiments of the invention provide a parallel multimedia conferencing system that allows a user to concurrently participate in multiple multimedia conferences. The parallel multimedia conferences are assigned priorities and rendered by a communication device executing a parallel multimedia conferencing agent based on the priorities. The parallel multimedia conferencing agent may concurrently render audio and other content in accordance with the rules specified by a user of the communication device and a participant of the multimedia conference.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method to provide parallel multimedia conferences, the method comprising:
receiving a request to initiate parallel multimedia conferences;
identifying preferences of a user that requested the parallel multimedia conferences;
establishing priorities for the parallel multimedia conferences based on preferences of the user and activity associated with each of the parallel multimedia conferences, wherein the priorities indicate foreground and background presence for the parallel multimedia conferences and the preferences specify volume levels associated with the priorities; and
providing content to each of the parallel multimedia conferences concurrently.

2. The method of claim 1, wherein the request is based on calendar data on the user's computing device.

3. The method of claim 1, wherein the request includes notification criteria specified by the user.

4. The method of claim 1, wherein the parallel multimedia conferences include any combination of voice or video.

5. The method of claim 1, further comprising: reconnecting to one or more conferences previously initiated by the user.

6. The method of claim 1, wherein the content is configured in a single stream of data that includes content for each of the parallel conferences the user is participating in.

7. The method of claim 1, wherein the content of the parallel multimedia conferences is transmitted in the format selected by the user.

8. The method of claim 7, wherein the format selected by the user is updated based on existing capabilities of the computing device currently utilized by the user.

9. A multimedia conferencing server, the server comprising:
one or more processors configured to execute instructions that receive a request to initiate parallel multimedia conferences, identify preferences of a user that requested the parallel multimedia conferences, establish priorities for the parallel multimedia conferences based on preferences of the user and activity associated with each of the parallel multimedia conferences, wherein the priorities indicate foreground and background presence for the parallel multimedia conferences and the preferences specify volume levels associated with the priorities, and the processors provide content to each of the parallel multimedia conferences concurrently, the content is formatted as a data stream based on preferences for the user.

10. The server of claim 9, wherein the one or more processors are configured to generate notifications based on the preferences of the user.

11. The server of claim 9, wherein the one or more processors are configured to automatically establish additional multimedia conferences for the user based on calendar data associated with the user.

12. The server of claim 9, wherein the one or more processors are configured to perform voice recognition to identify participants that speak during the multimedia conferences.

13. The server of claim 12, wherein the one or more processors are configured to generate transcripts of the parallel multimedia conferences.

14. The server of claim 13, wherein the transcripts are separated based on each of the multimedia conferences.

15. The server of claim 13, wherein the transcripts for each of the parallel multimedia conferences are combined in a unified transcript.

16. One or more non-transitory computer-readable media having computer-executable instructions embodied thereon for performing a method to provide parallel multimedia conferences, the method comprising:
receiving a request to initiate parallel multimedia conferences;
identifying preferences of a user that requested the parallel multimedia conferences;
establishing priorities for the parallel multimedia conferences based on preferences of the user and activity associated with each of the parallel multimedia conferences, wherein the priorities indicate foreground and background presence for the parallel multimedia conferences and the preferences specify volume levels associated with the priorities; and
providing content to each of the parallel multimedia conferences concurrently.

17. The media of claim 16, wherein the preferences identify transcription service formats and audio formats for audio content associated with the parallel multimedia conferences.

18. The media of claim 16, wherein one of the parallel multimedia conferences is associated with a foreground position and the remaining parallel multimedia conferences are associated with a background position.

19. The media of claim 16, wherein the priorities dynamically adjust based on the content of the parallel multimedia conferences and the preferences of the user.

* * * * *